Patented Aug. 27, 1929.

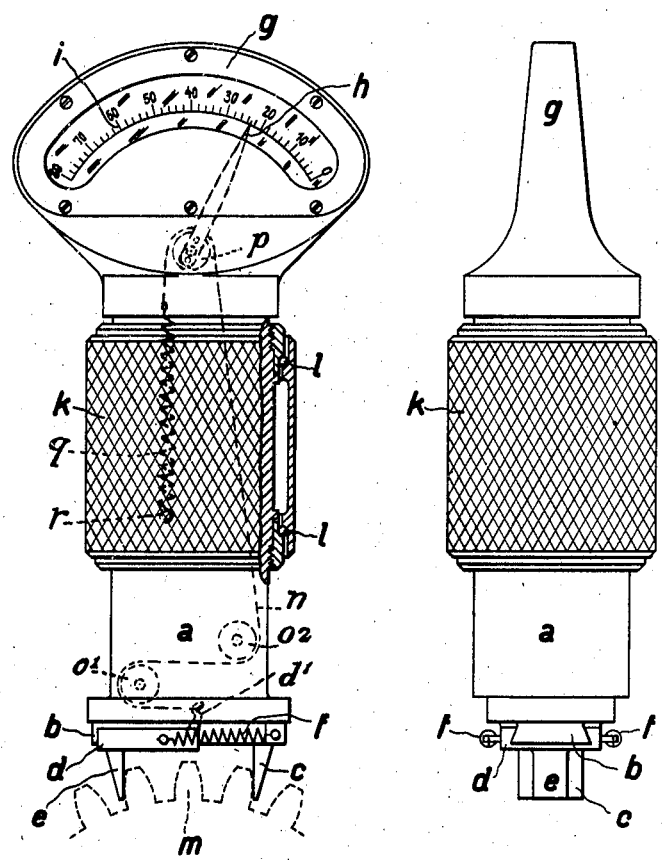

1,726,129

UNITED STATES PATENT OFFICE.

ADOLF STEINLE, OF JENA, GERMANY, ASSIGNOR TO CARL ZEISS, OF JENA, GERMANY, A FIRM.

FEELER GAUGE WITH HANDLE.

Application filed April 20, 1927, Serial No. 185,338, and in Germany April 21, 1926.

When using feeler gauges with handle and two feeling members disposed opposite each other, of which one acts against spring pressure upon an indicating device, there may easily arise errors in measurement owing to a restless attitude of the hand. According to the present invention this drawback may be obviated by rendering the handle rotatable on the gauge. The advantage of the new feeler gauge is particularly conspicuous if the feeling members of the gauge, on being used, are in contact with the body to be tested not only in a point but along a line or even on a surface as is frequently the case with feeler gauges for testing the pitch of toothed wheels. When using a gauge having a firm handle, possibly by the unavoidable unrest of the user's hand the feeling members and the teeth temporarily would touch each other in single points only instead of touching each other in contact lines or contact surfaces. Consequently either the result of the test would be wrong or at least uncertain owing to the oscillations of the indicating device caused by the unrest of the hand. A feeler gauge of this kind constructed according to the invention obviates this drawback, especially if the axis of rotation of the handle be perpendicular to the direction of measurement and if the gauge be substantially constructed symmetrically with respect to two planes intersecting in this axis of rotation and being perpendicular to each other.

The annexed drawing shows as a constructional example a feeler gauge for testing gears according to the present invention. Fig. 1 shows the gauge in an elevation, partly in a section and Fig. 2 is a side elevation.

On a gauge cylindrical body $a$ is disposed perpendicular to its axis a carriage guide $b$, carrying a feeling member $c$ and a carriage $d$. The latter, on which is fixed a second feeling member $e$, is under the action of two springs $f$ which tend to displace it so as to approach the feeling member $c$. The gauge body $a$ is provided with a casing $g$ containing an indicating device, the casing being symmetrically constructed with respect to two planes, intersecting in its axis and perpendicular to each other. To this indicating device appertains an index $h$, indicating on a scale $i$ the position of the feeling member $e$ relatively to the feeling member $c$. On the gauge body $a$ a roughened handle $k$ is supported rotatably on balls $l$ about the axis of the gauge body $a$.

The carriage $d$ has an extension $d^1$, projecting into the interior of the gauge body $a$. On this extension $d^1$ acts a steel band $n$, guided over two rollers $o^1$ and $o^2$ and enclosing a roller $p$, which is rigidly connected to the index $h$ and rotatably supported in the casing $g$. The free end of the steel band $n$ is fixed on a draw spring $q$ whose elasticity is smaller than that of the spring $f$ and which acts on a pin $r$ fixed in the gauge body $a$.

When the feeler gauge is in use, the feeling members $c$ and $e$ bear under the action of the springs $f$ with their whole width along a surface line against the profiles of one or several teeth of a wheel $m$ and thus afford a reliable reading of the distance apart of these two surface lines on the scale $i$ by means of the index $h$ because the unavoidably restless attitude of the hand of the user, seizing the handle, only causes rotations of this handle $k$ about the axis of the gauge body $a$ without exerting momenta of rotation upon the gauge body $a$ itself.

I claim:

1. A feeler gauge containing a casing, two feeling members fitted on the casing, at least one of the two feeling members being movably disposed with respect to said casing, a scale and an index on said casing, coacting with each other and displaceable relatively to each other, means containing a spring arrangement and adapted to convert a relative displacement of the feeling members into a relative displacement of the scale and the index, and a handle rotatably mounted on the casing.

2. A feeler gauge containing a casing, two feeling members fitted on the casing, at least one of the two feeling members being movably disposed with respect to said casing, a scale and an index on said casing, coacting with each other and displaceable relatively to each other, means containing a spring arrangement and adapted to convert a relative displacement of the feeling members into a relative displacement of the scale and the index, and a handle mounted on the casing rotatable about an axis perpendicular to the direction in which the two feeling members are movable relatively to each other.

3. A feeler gauge containing a casing, two feeling members fitted on the casing, at least one of the two feeling members being movably disposed with respect to said casing, a scale and an index on said casing, coacting with each other and displaceable relatively to each other, means containing a spring arrangement and adapted to convert a relative displacement of the feeling members into a relative displacement of the scale and the index, and a handle mounted on the casing rotatable about an axis, perpendicular to the direction in which the two feeling members are movable relatively to each other, the casing being symmetrical with respect to two planes, which perpendicularly intersect in this axis of rotation.

ADOLF STEINLE.